(12) United States Patent
Lee et al.

(10) Patent No.: US 8,955,870 B2
(45) Date of Patent: Feb. 17, 2015

(54) TRACKING FOLDABLE CART

(75) Inventors: Chunghsin Lee, Lynnfield, MA (US); Jian Zhang, Brookline, MA (US)

(73) Assignee: FTR Systems, Inc, Las Vegas, NV (US)

( * ) Notice: Subject to any disclaimer, the term of this patent is extended or adjusted under 35 U.S.C. 154(b) by 280 days.

(21) Appl. No.: 13/573,035

(22) Filed: Aug. 15, 2012

(65) Prior Publication Data

US 2013/0103245 A1 Apr. 25, 2013

Related U.S. Application Data

(60) Provisional application No. 61/628,039, filed on Oct. 21, 2011, provisional application No. 61/633,359, filed on Feb. 9, 2012.

(51) Int. Cl.
| | |
|---|---|
| B62B 3/02 | (2006.01) |
| B60K 1/02 | (2006.01) |
| G05D 1/02 | (2006.01) |
| B60L 15/20 | (2006.01) |
| B62B 5/00 | (2006.01) |

(52) U.S. Cl.
CPC ............... *B60K 1/02* (2013.01); *G05D 1/0255* (2013.01); *B60L 15/20* (2013.01); *B62B 2202/404* (2013.01); *G05D 2201/0204* (2013.01); *B62B 5/0076* (2013.01); *Y10S 280/05* (2013.01); *Y10S 280/06* (2013.01)
USPC ............... 280/651; 280/DIG. 5; 280/DIG. 6; 280/DIG. 5

(58) Field of Classification Search
CPC  B60R 21/16; B62B 2202/404; B62B 5/0076; Y10S 280/05; Y10S 280/06; B60K 1/02; G05D 1/0255; G05D 2201/0204; B60L 15/20
USPC ........ 280/735, 29, 734, 727, 400, 491.1, 639, 280/47.17, 47.26, 651, DIG. 6; 206/315; 180/167, 168
See application file for complete search history.

(56) References Cited

U.S. PATENT DOCUMENTS

| | | | | | |
|---|---|---|---|---|---|
| 3,472,333 | A | * | 10/1969 | Loewenstern, Jr | 180/167 |
| 3,812,929 | A | * | 5/1974 | Farque | 180/167 |
| 3,856,104 | A | * | 12/1974 | Ohba | 180/167 |
| 3,893,532 | A | * | 7/1975 | Perlowin | 180/19.1 |
| 4,106,583 | A | * | 8/1978 | Nemeth | 180/65.6 |
| 4,356,875 | A | * | 11/1982 | Clune | 180/13 |
| 4,418,776 | A | * | 12/1983 | Weirick | 180/19.3 |
| D280,943 | S | * | 10/1985 | Catford | D34/15 |
| 4,570,732 | A | * | 2/1986 | Craven | 180/19.3 |
| D300,577 | S | * | 4/1989 | Pope et al. | D34/15 |
| 4,844,493 | A | * | 7/1989 | Kramer | 180/169 |
| 4,926,161 | A | * | 5/1990 | Cupp | 340/988 |
| 5,137,103 | A | * | 8/1992 | Cartmell | 180/167 |
| 5,161,635 | A | * | 11/1992 | Kiffe | 180/19.3 |
| 5,167,389 | A | * | 12/1992 | Reimers | 248/96 |
| 5,180,023 | A | * | 1/1993 | Reimers | 180/19.1 |

(Continued)

*Primary Examiner* — Hau Phan
*Assistant Examiner* — Jacob Meyer
(74) *Attorney, Agent, or Firm* — Don Halgren (57) ABSTRACT

A foldable cart assembly which is arranged to provide trackable transportation to a product or a person. The cart contains sensors and computer-controlled drive wheels to enable that cart assembly, when fully opened, to follow a safe path as directed by received electronic signals. That cart assembly is also tri-foldably collapsible, so as to have multiple portions pivoted into nesting configuration with one another thus containable in a minimal volume and even carried by an individual.

19 Claims, 8 Drawing Sheets

(56) References Cited

U.S. PATENT DOCUMENTS

| | | | |
|---|---|---|---|
| 5,350,982 A * | 9/1994 | Seib | 318/139 |
| 5,375,673 A * | 12/1994 | McCall et al. | 180/13 |
| 5,517,098 A * | 5/1996 | Dong | 318/581 |
| 5,611,406 A * | 3/1997 | Matsuzaki et al. | 180/167 |
| 5,657,828 A * | 8/1997 | Nagamachi | 180/19.3 |
| D389,782 S * | 1/1998 | Scott et al. | D12/16 |
| 5,711,388 A * | 1/1998 | Davies et al. | 180/168 |
| 5,749,424 A * | 5/1998 | Reimers | 180/19.2 |
| 5,810,105 A * | 9/1998 | Trainer | 180/169 |
| 5,944,132 A * | 8/1999 | Davies et al. | 180/168 |
| 6,276,470 B1 * | 8/2001 | Andreae et al. | 180/19.3 |
| 6,327,219 B1 * | 12/2001 | Zhang et al. | 367/128 |
| 6,345,836 B1 * | 2/2002 | Wu | 280/651 |
| 6,404,159 B1 * | 6/2002 | Cavallini | 318/587 |
| 6,502,656 B2 * | 1/2003 | Weiss et al. | 180/168 |
| 6,659,208 B2 * | 12/2003 | Gaffney et al. | 180/19.2 |
| 6,698,789 B2 * | 3/2004 | Reimers et al. | 280/651 |
| 6,719,319 B2 * | 4/2004 | Liao | 280/654 |
| 7,017,691 B2 * | 3/2006 | Lu | 180/65.1 |
| 7,353,089 B1 * | 4/2008 | McEvoy | 701/2 |
| 8,292,321 B2 * | 10/2012 | Liao | 280/652 |
| 8,393,633 B2 * | 3/2013 | Liao | 280/651 |
| 8,403,355 B2 * | 3/2013 | Liao | 280/651 |
| 8,480,098 B2 * | 7/2013 | Liao | 280/47.26 |
| 8,500,153 B2 * | 8/2013 | Liao | 280/651 |
| 8,613,463 B2 * | 12/2013 | Liao | 280/651 |
| 2002/0163164 A1 * | 11/2002 | Shapiro et al. | 280/651 |
| 2003/0122353 A1 * | 7/2003 | Liao | 280/651 |
| 2009/0038864 A1 * | 2/2009 | Yun | 180/19.1 |
| 2009/0295639 A1 * | 12/2009 | Zhao et al. | 342/387 |
| 2010/0168934 A1 * | 7/2010 | Ball et al. | 701/2 |
| 2012/0112436 A1 * | 5/2012 | Liao | 280/651 |
| 2013/0098700 A1 * | 4/2013 | Zhang et al. | 180/167 |
| 2013/0103245 A1 * | 4/2013 | Lee et al. | 701/23 |

\* cited by examiner

TRACKING FOLDABLE CART

This application relates to portable, foldable, autonomous, wireless signal-following trackable carts which may be utilized as golf carts, as grocery carts, as supply carriages or as delivery vehicles, farm vehicles/equipment and in medical facilities for tracking transportation therewithin, and is based upon our U.S. Provisional Patent Application Nos. 61/628,039, filed Oct. 21, 2011, and 61/633,359, filed Feb. 9, 2012, each being incorporated herein by reference in their entirety, and our co-pending brother U.S. patent application Ser. No. 13/573,036 co-filed herewith on 15 Aug. 2012 also incorporated herein by reference in its entirety

DISCUSSION OF THE PRIOR ART

Foldable and collapsible carts and particularly collapsible golf carts have been around for many years. Examples may be seen for instance and U.S. Pat. No. 5,749,424 to Reimers; U.S. Pat. No. 4,793,622, to Sydlow; and U.S. Pat. No. 4,418,776 to Weirick. Some of these carts are even self powered, as for example U.S. Pat. No. 4,106,583 to Nemeth and of course the "Segway"™ vehicle shown in U.S. Pat. No. 7,958,961 to Schade. These prior art carts are limited in their foldability and the collapsability, wherein their ultimate collapsed size would not permit them for instance to be carried aboard an airliner and stored in an overhead compartment. Further, the prior art fails to disclose a uniquely autonomous, trackable, collapsible cart has identified herein as the present invention.

It is thus an object of the present invention to overcome the disadvantages of the prior art.

It is a further object of the present invention to provide an autonomous, mobile four wheeled cart arrangement capable of multiple down-size foldings, capable of minimal storage requirements.

BRIEF SUMMARY OF THE INVENTION

The present invention relates to a four-wheeled foldable cart assembly which articulates from a fully opened, load-supportive frame assembly into a compact and hand carryable mechanism which in one preferred embodiment could be stored for example, in an overhead bin in an airliner. Such assembly could be usefully configured and properly adapted to perform as a golf cart, a baby carriage, a shopping cart, a transport vehicle and/or a wheel chair amongst other various adaptable configurations as well.

The foldable cart assembly in a first preferred embodiment of the present invention for use as for example, as a golf cart for totting golf bags, comprises a lower base frame having a first end and a second end. A transverse axle member extends across the first end of the lower base frame. A free wheeling coaster wheel is pivotally supported at each end of the transverse axle member of the first end of the assembly.

The lower base frame has a first pivot arrangement along a mid-portion thereof. The second end of the lower base frame has a transverse drive axle extending there across. A rotatably empowered, independently controlled wheel is arranged at each end of the transverse drive axle on the second end of the assembly.

Each independently controlled wheel at each end of the transverse drive axle on the second end of the cart assembly is independently controlled as to speed and direction of rotation by a pair of computer controlled electronic drive motors. A housing arranged supportively on the second end of the lower base frame encloses a control computer, the drive motor controls and a power supply unit. The control computer receives information from a multiple transceiver sensor arrangement installed on and within the cart assembly.

A pair of upwardly and forwardly directed generally first parallel frame members extend away from the first pivot arrangement disposed at the mid-portion of the lower base frame. A pair of generally parallel mid-frame members pivotally extend from a transverse member extending across the upper end of the first parallel frame members The upwardly and forwardly directed mid-frame members have an upwardly directed distal end with a first transverse support bar extending therebetween and thereacross. A tightenable knob or hub means is arranged at the juncture of the upward frame members and the U-shaped handle so as to secure into a fixed position that U-shaped handle with respect to the parallel, upwardly and forwardly directed frame members.

The upwardly and forwardly directed mid-frame members also have a transverse pivot axis arranged about one-third the way up from the lower base frame member. The lower base frame member has a strap arrangement to secure any baggage such as for example, in this preferred embodiment, a golf club bag thereto.

A generally L-shaped bracket is attached to a midpoint of each of the upwardly and forwardly directable mid-frame members and extend forwardly towards the second end of the cart assembly, and generally parallel to the lower base frame arrangement. Each L-shaped bracket is spaced transversely apart from one another. These L-shaped brackets include portions of the multiple transceiver sensor arrangement within the cart assembly. Each L-shaped bracket has a distal end with a first electronic transceiver sensor member preferably arranged therewithin. The first sensor members in one preferred embodiment, are for example, ultrasound sensors. A second sensor arrangement, such as for example, an RF or "radio frequency" member, may also be arranged on/in the cart assembly or for example, in the housing, to facilitate timing and detection of tracking targets, obstacles including sand pits, water and/or some other sort of travel-blocking entity.

The first and second sensor members of the sensor arrangement are in proper electrical communication through a circuit connected with the control computer preferably arranged within the housing which is secured at the second end portion of the lower frame member. The multiple sensors enable the cart assembly to autonomously follow the path of for example, someone leading the way, such as for example, on a golf course, with a person-carryable (remote control) location-transmitting device. The transversely separated first sensors each receive a common signal from the location transmitting device on for example a golfer or the like, whereupon the control computer triangulates that differentially received and timed continuously emitted signal so as to appropriately effect the rotation of the drive wheels, both as to rotational direction and as to rotational speed, thereby controlling the path to be taken by the cart assembly.

The multiple sensor arrangement also provides proper feedback to the control computer so that the control computer may also further control the direction of rotation and the speed of each individual drive wheel so as to avoid obstructions in the path of the card assembly, yet still properly follow the location transmitting device through a non-linear path, if need be.

A fifth or "safety" wheel is pivotally supported off of a "J"-shaped axis extending longitudinally from a pivot arrangement on the axle on the second end of the foldable cart assembly. The fifth wheel acts so as to prevent an overturn of the cart assembly if it were going up an incline or needed further balance.

The cart assembly is articulable so as to be folded inwardly upon itself about its various pivot axes so as to be collapsible into a very compact configuration. The U-shaped handle at the upper end of the parallel frame members may be pivoted about its mid-frame transverse axis so as to swing in that U-shaped handle rearwardly or forwardly as necessary. The mid-frame members are pivotable about the transverse member across the lower base frame. The base frame is foldable about its pivot arrangement located along its mid-portion. The upwardly directed frame members, having that transverse pivot axis arranged about one third of the way up from the lower base member may in itself be pivoted around that transverse pivot axis to further compact the cart assembly. The J-shaped member supporting the fifth or counter-tip over wheel is pivotable about its juncture with the first transverse axle so as to bring the fifth wheel into position between the drive wheels. The entire cart assembly is ultimately carryable by the transverse pivot axis arranged between the upwardly directed frame members, thus functioning as a carry handle.

The invention thus comprises an articulably collapsible cart assembly having a lower frame, the cart assembly enabled to carry a load in an open orientation, and to be collapsed into a minimal tri-folded configuration without a load, the cart assembly comprising: a lower frame first end having a pair of free-wheeling support wheels in a spaced apart manner on an axle; a lower frame second end connected to the first end by a connecting frame, the second end having a pair of wheels thereon, and wherein the connecting frame has a lower collapse axis thereon; an upper frame arrangement connected to the lower frame, the upper frame arrangement having an uppermost collapse axis there-across and an intermediate collapse axis, the uppermost collapse axis and the intermediate collapse axis enabling the uppermost frame arrangement to be pivoted counter to one another to collapse the cart assembly into a hand-carryable configuration. The intermediate axis comprises a carry handle for the cart assembly in its collapsed hand-carryable configuration. The second end of the frame has a pair of drive wheels thereon. Each of the pair of drive wheels are empowered by an independent drive motor. A fifth wheel is preferably supported between the pair of drive wheels. The fifth wheel is adjustably supported about a swivel axis. A pair of horizontally spaced apart sensor support arms extend from the upper frame arrangement. The lower frame and the upper frame arrangement each have a load supporting securement arrangement thereon. An enclosure housing is preferably supportively arranged between the drive wheels, so as to enclose computer control means and empowerment means therein. The uppermost collapse axis adjustably supports a "U" shaped handle.

The invention also comprises a method of collapsing a cart assembly from an open, load carrying, autonomously-movable configuration to a collapsed minimally sized, hand carryable configuration, comprising one or more of the steps of: connecting a wheeled first frame end to a wheeled second frame end by a lower pivot axis articulably disposed therebetween, thereby constructing an elongated lower frame arrangement; connecting an upper frame arrangement to the wheeled first end of the lower frame arrangement; dividing the upper frame arrangement into an intermediate, pivotable frame portion and a pivotably attached uppermost frame portion connected to one another by an intermediate pivot axis; swinging the wheeled first end of the elongated lower frame arrangement about its lower pivot axis, and into a disposition under the wheeled second frame end of the elongated lower frame; swinging the uppermost frame portion about an upper pivot axis into a nesting disposition between side portions of the intermediate pivotable frame portion; swinging the combined uppermost frame portion nested between the side portions of the intermediate pivotable frame portion and the intermediate pivotable frame portion about an intermediate pivot axis so as to lie on top of and into close nesting orientation with the second wheeled end of the elongated lower frame portion, wherein the intermediate pivot axis becomes a carry handle for the cart assembly. The wheeled second frame end preferably has a pair of motorized wheels thereon. The motorized wheels are individually empowered as to direction and speed by a control computer. The cart assembly may be a golf club carrying cart.

DETAILED DESCRIPTION OF THE INVENTION

Figure 1:
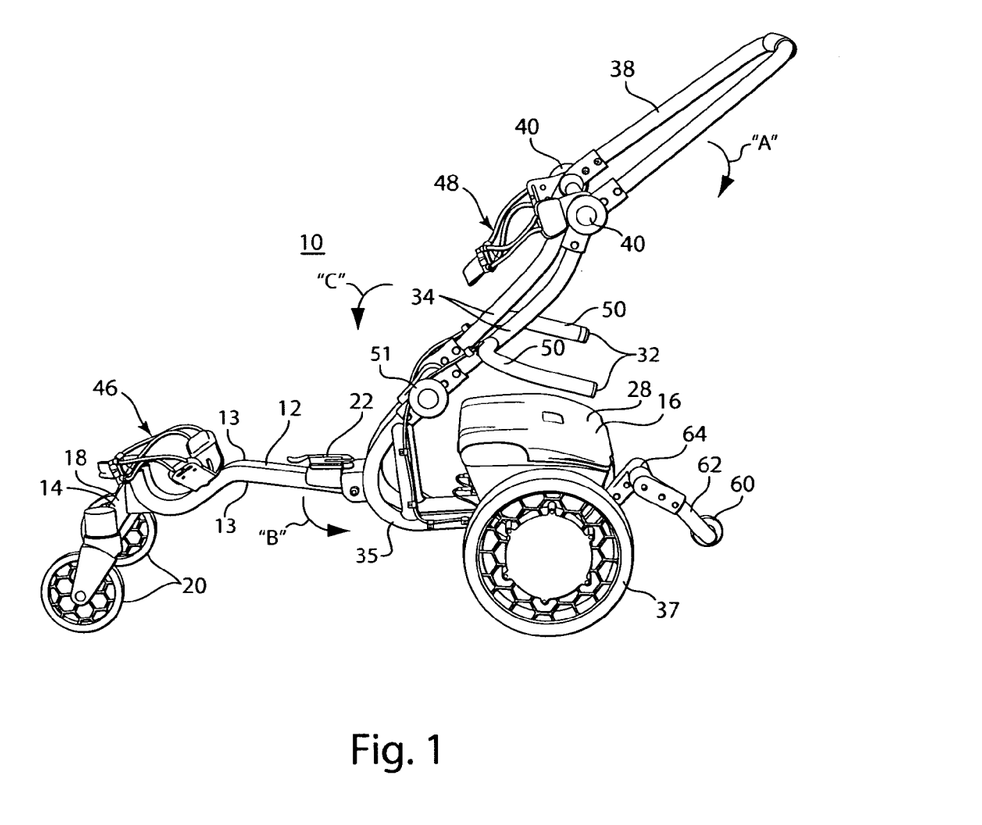
FIG. 1 is a view showing a first side of the cart assembly.
Figure 2:
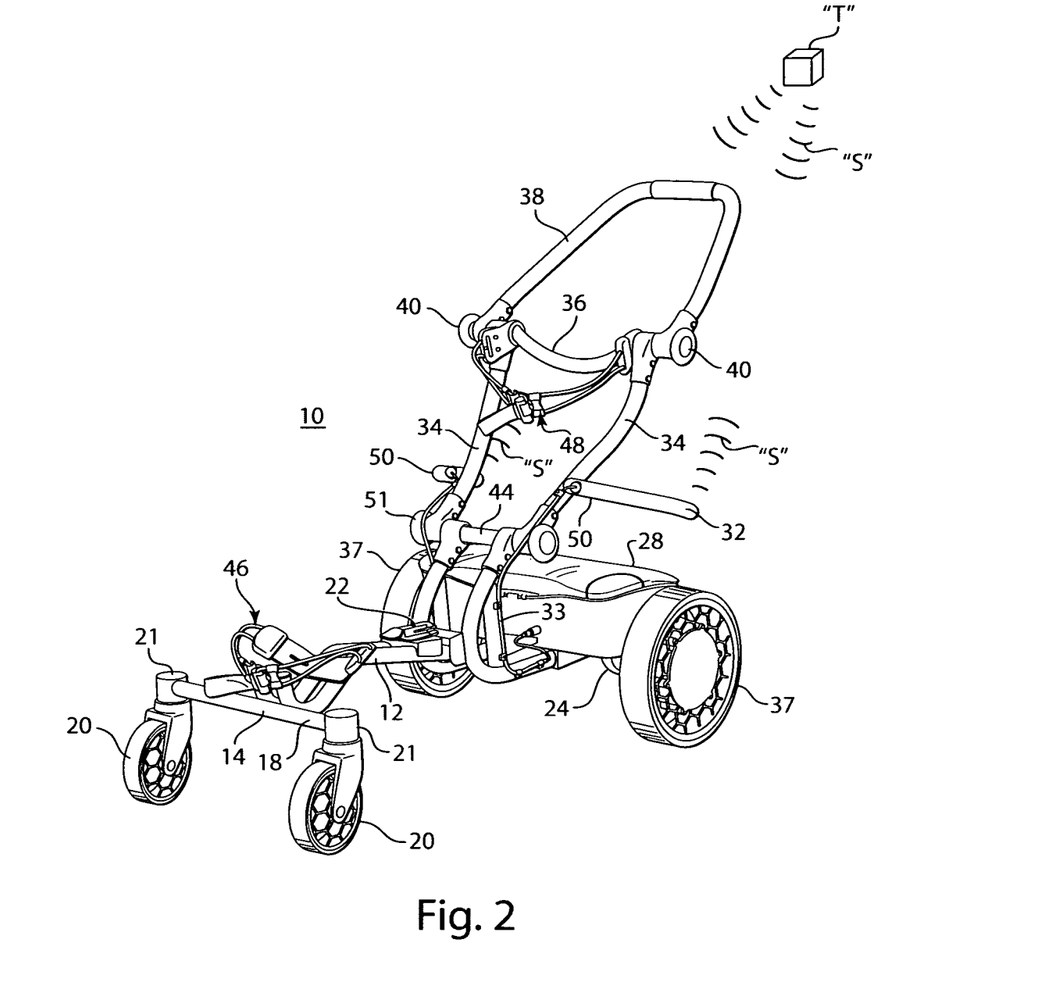
FIG. 2 is a view showing a perspective view of the cart assembly showing portions of a first end and the first side.
Figure 3:
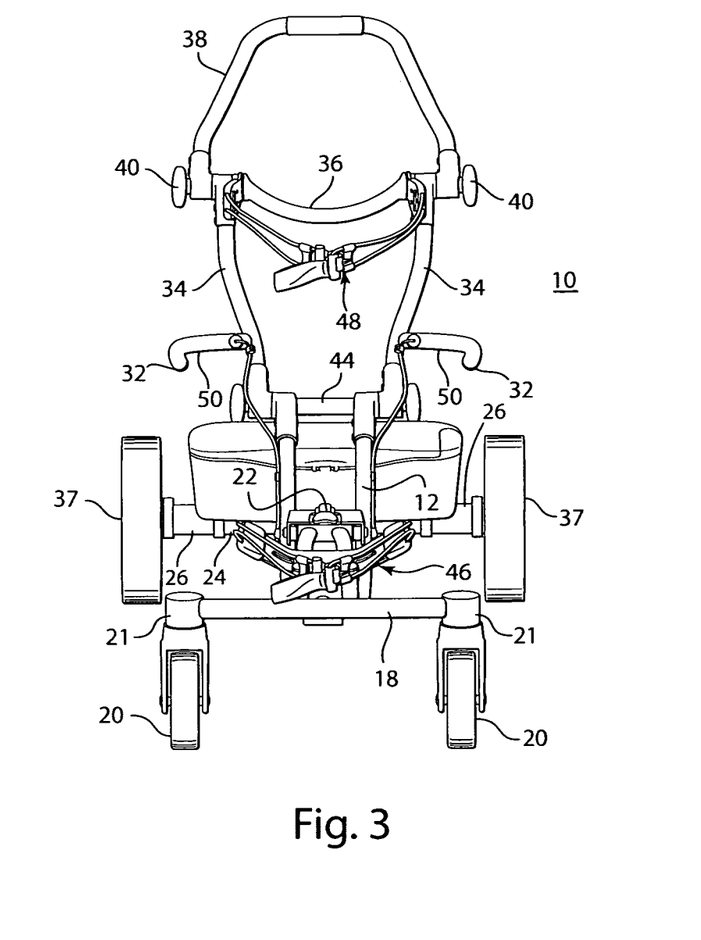
FIG. 3 is a view showing the cart assembly from a first end perspective.

Referring now to the figures in detail, the present invention relates to a foldable cart assembly 10 as best shown in FIGS. 1, 2 and 3, which cart assembly 10 articulates from a fully opened, supportive frame assembly, shown most descriptively in FIGS. 1 and 2 into a compact and hand carryable mechanism as shown in FIGS. 6, 7, 8 and 9, which in one preferred embodiment is very easily carried by one hand and could also be stored, for example, in a travel bag or in an overhead bin in an airliner.

The foldable cart assembly 10 of the present invention comprises a lower base frame 12 having a first end 14 and a second (or front) end 16. The lower base frame 12 in a first embodiment, comprises a pair of rails 13 extending longitudinally from the first end 14 towards the second end 16. A transverse axle member 18 extends across the first end 14 of the lower base frame 12. A free wheeling coaster wheel 20 is pivotally supported at a swivel joint 21 secured on each end of the front transverse axle member 18, as may be best seen in FIGS. 1, 2 and 3.

The lower base frame 12 has a lower pivot arrangement 22 along a mid-portion thereof, as may be seen best in FIGS. 1, 2, 5 and 6. The second end 16 of the lower base frame 12 has a transverse drive axle arrangement 24 extending thereacross, as may be seen in FIG. 3. A rotatably empowered, independently controlled wheel 37 is arranged at each end of the transverse drive axle 24, also best shown in FIGS. 3 and 4.

Figure 4:
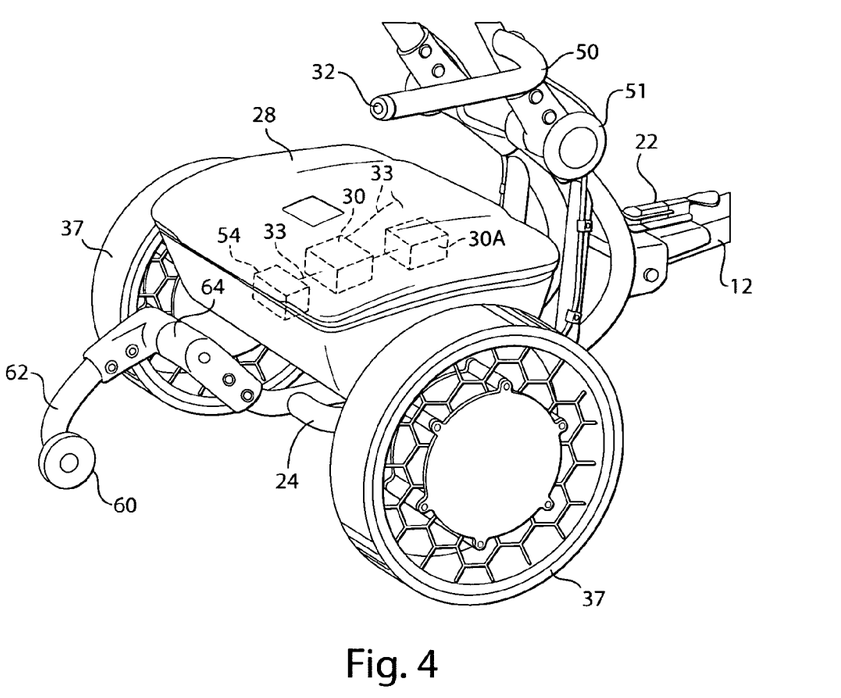
FIG. 4 is a view the second end of the cart assembly showing the drive wheels, the fifth wheel and the housing which is mounted on the transverse axle, from a second side of the cart assembly.

Each independently controlled wheel 37 at each end of the transverse drive axle arrangement 24 is independently controlled as to speed and direction of rotation by for example, a computer controlled electronic drive motor 26 as best shown in FIG. 3. A housing 28 arranged supportively on the rear end 16 of the lower base frame 12, as shown in FIGS. 1, 2, 3 and 4. The housing 28 encloses a control computer 30, including the drive motor controls and a power supply unit 30A, as represented in FIG. 4. The control computer 30 receives information from a first sensor (ultrasound) arrangement 32 and a second (or RF) sensor arrangement 54 arranged installed within the cart assembly 10, which are represented generally, in FIGS. 1 and 2.

Figure 5:
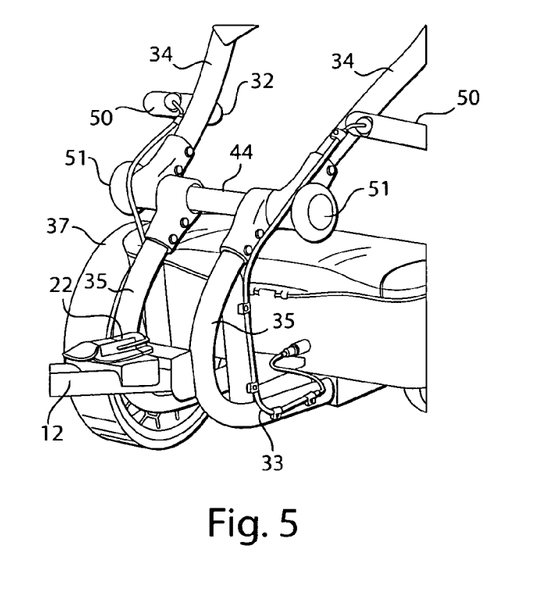
FIG. 5 is a close up partial view in perspective, of the mid transverse pivot axis and adjustment knobs, as well as the pivot arrangements on the lower base frame with its lock member secured thereon, as they appear from the first side of the cart assembly.
Figure 6:
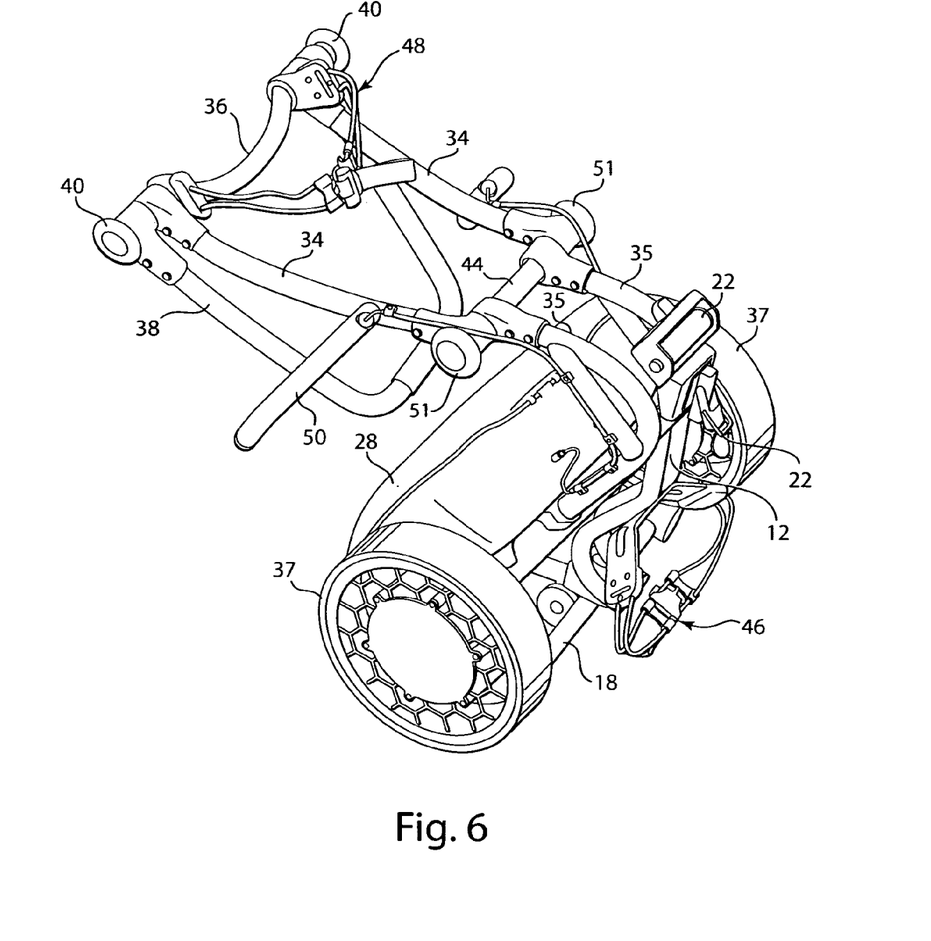
FIG. 6 is a view, shown in perspective, showing the U-shaped handle pivoted about its axis toward the second end of the cart assembly, and the upper portion of the upwardly directed frame members about to be pivoted about its transverse axis.

A pair of upwardly directed (articulable) generally parallel mid-frame members 34 extend away from a first transverse pivot axis 44, the pivot axis 44 being supported by the pair of curved side bars 35, best seen in FIGS. 2, 3 and 5. The curved side bars 35 each have a lower end attached to the frame 12 adjacent to the lower pivot arrangement 22. The lower pivot arrangement 22 is disposed at the mid-portion of the lower base frame 12, as shown in FIGS. 1, 2 and 3. The upwardly directed (when the cart assembly is operational) mid-frame members 34 articulably extend from the first transverse pivot axis 44, and support a transverse mid-frame support bar axis 36 extending therebetween, as best shown in FIGS. 2, 3 and 6. A generally U-shaped, articulable, upper frame member handle 38 is articulately attached at the ends of the mid-frame support axis 36, connecting the upper or distal ends of the upwardly directed generally parallel mid-frame members 34, as shown in FIGS. 1, 2 and 3. An upper frame member controllable adjustment/tightenable knob or hub 40 is arranged at the juncture of the upward frame members 34 and the ends of the U-shaped handle 38 so as to adjustably secure into a fixed position that U-shaped handle 38 with respect to the parallel, upwardly directed (articulable) frame members 34 and the mid-frame support axis or bar 36.

The upwardly directed frame members 34 have the transverse second or mid pivot-axis 44 (which mid-pivot axis or bar 44 is also the "carry or lift handle" when the cart assembly is fully tri-folded up/collapsed) arranged about one-third the way up from the lower base frame member 12, best represented in FIGS. 2, 3, 5 and 6.

The lower base frame member 12 has a load supporting first strap arrangement 46 to secure any baggage such as a golf club bag thereto, and a second, load-engaging, support strap arrangement 48 across the mid-frame support axis or bar 36, as best seen in FIGS. 1 and 2.

A generally L-shaped sensor support bracket 50 is fixedly attached preferably to a midpoint of each of the upwardly directable frame members 34, and extend towards the second or front end 16 of the cart assembly 10, generally parallel to the ground and the lower base frame arrangement 12, as best shown in FIGS. 1, 2 and 3. Each L-shaped sensor support bracket 50 is spaced transversely apart a specific horizontal distance from one another. These L-shaped sensor support brackets 50 each support an ultrasound sensor arrangement member 32 on their respective distal ends of the sensor support brackets 50 of the cart assembly 10, each sensor 32 being in proper communication through a proper circuit 33 with the control computer 30, as is represented in FIG. 4. The first electronic sensor 32 arrangements are spaced apart from one another a specific distance for control computer triangulation purposes, the sensor support brackets 50 and sensor members 32 best represented in FIGS. 2 and 3.

The pair of sensors 32 in one preferred embodiment may be for example, an ultrasound generating arrangement sensor. Also, an RF or radio frequency or (second) sensor array 54 may also arranged on/or within the frame or in the housing 28, also arranged in communication with the control computer 30 through the proper circuit 33, the RF sensor array 54 being arranged to provide computer controlled timing of ultrasound detected tracking targets, moving targets, obstacles including sand pits, water and some sort of cart assembly travel-blocking entity, and facilitates instructions transmitted to the control computer 30 via the circuit 33, as to movement direction instructions and to potential interference to the movement of the cart assembly 10.

The first and second sensor arrays 32 and 54 of the sensor arrangement are in proper electrical communication through a proper circuit 33 connected with the control computer 30 arranged within the housing 28 at the second or front end portion 16 of the lower frame member 12, as represented in FIG. 4. The combination of the first and second sensor arrangements 32 and 54 enables the cart assembly 10 to autonomously follow the path of for example, someone leading the way, or of following inputted instructions, such as on a golf course, from the person carrying a (remote control) location-transmitting and operator input receiving transponder device "T", represented in FIG. 1, and further described in our co-pending, commonly owned and filed brother patent application Ser. No. 13/573,036. The transversely separated first sensors 32 each receive a common signal from the location transmitting device "T" carried on for example, a golfer or the like, whereupon the control computer 30 triangulates that differentially received and timed signal so as to appropriately record, calculate and control the path and timed position of the transponder "T" so as to effect the computer controlled rotation of the drive wheels 26, both as to rotational direction and as to rotational speed, thereby steering and thus controlling the path to be taken by the cart assembly 10.

The second sensor arrangement 54 also provides proper feedback to the control computer 30 as to the timing and acts as a clock for following the ultrasound signals sent and received by the sensor arrangement 32 and 54 into the control computer 30, so that the control computer 30 may also thus control the direction of rotation and speed of each individual drive wheel 26 so as to avoid obstructions in the path of the card assembly, yet still properly follow the location transmitting device, through a non-linear or a non-direct path, if need be.

A fifth wheel 60, shown best in FIG. 4 is supported off of a "J"-shaped axis 62, extending longitudinally from a pivot arrangement 64 on the rear axle arrangement 24. The fifth wheel 60 acts so as to prevent a rearward overturn of the cart assembly if it were going up or down an incline or needed further balance control.

Figure 7:
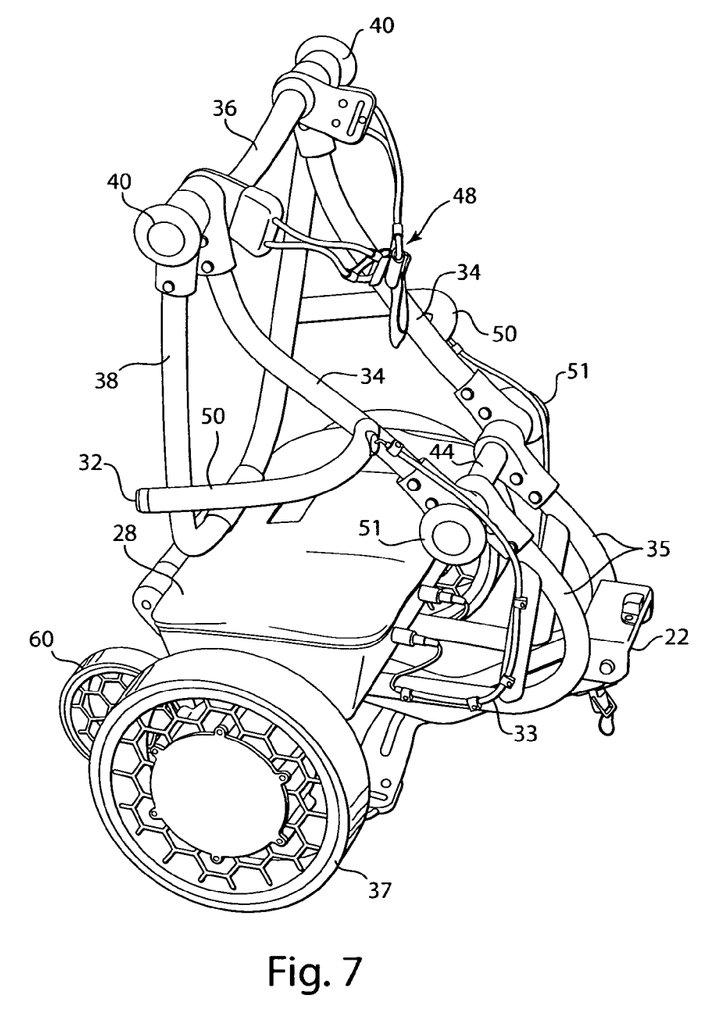
FIG. 7 is a view in a generally side elevational representation, showing the cart assembly in a nearly fully-collapsed configuration.
Figure 8:
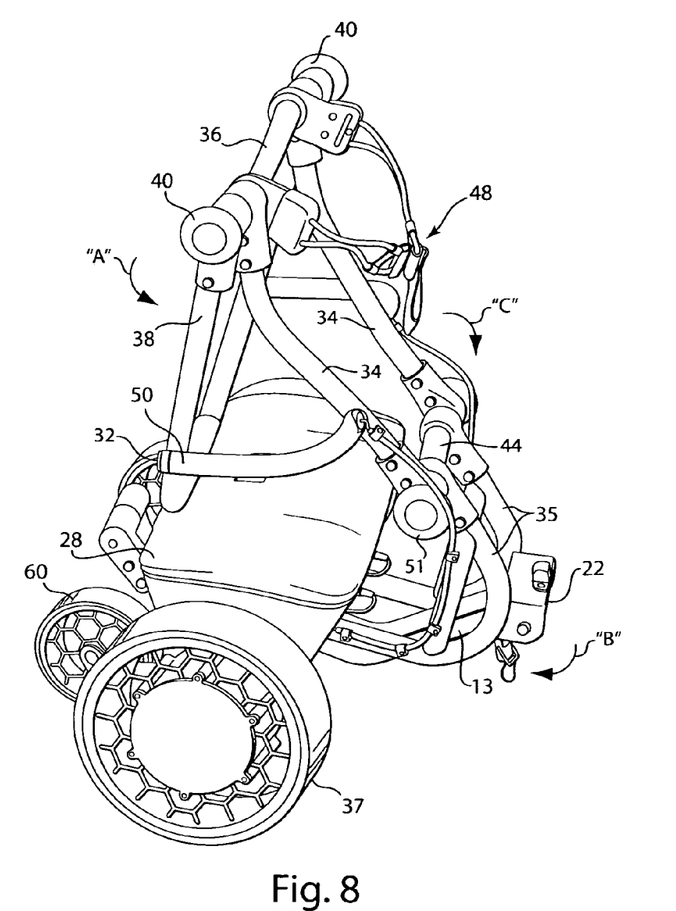
FIG. 8 is a view similar to that shown in FIG. 7 showing the portions of the cart assembly being collapsed about its rotational axes elements.
Figure 9:
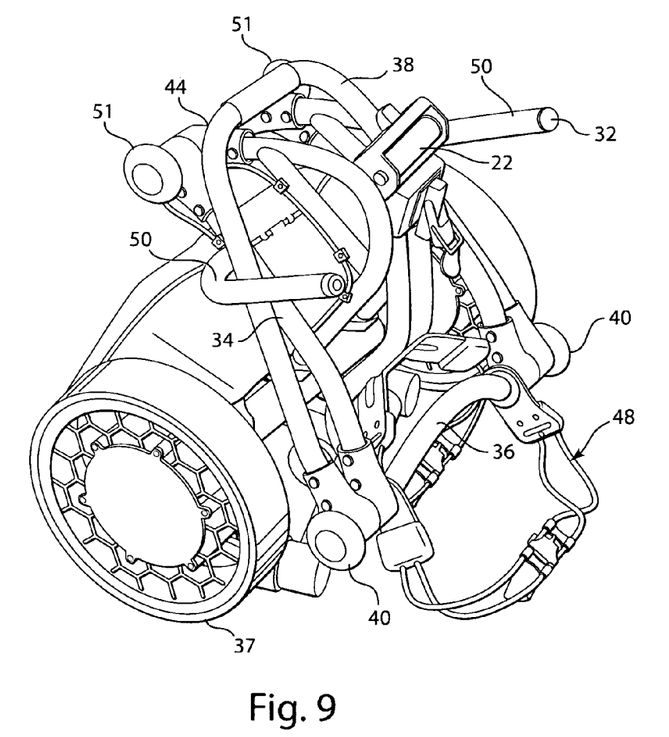
FIG. 9 is a view in a generally second side perspective representation showing the cart assembly in a fully compressed configuration, ready for transport by a user who would carry it by its transverse axis handle.

The cart assembly 10 is articulable so as to be folded inwardly upon itself about its various multiple, height-wise and lengthwise spaced-apart pivot axes, as shown in FIGS. 6, 7, and 8, so as to be articulably collapsible into a very compact, easily held, easily carried by axis or bar 44, somewhat hidden in FIG. 9, in its "almost fully" collapsed and easily stored configuration, as represented in FIG. 9.

The U-shaped upper handle 38 at the upper end of the parallel frame members 34 may be adjustably and tightenably pivoted about its transverse, upwardly disposed, elongated support axis 36 so as to swing in that U-shaped handle 38 such as in a direction as indicated by arrow "A" as necessary, in FIG. 1. The lower base frame 12 is foldable about its pinched, low-level-frame-positioned, second axis or collapse-pivot arrangement 22 located along the longitudinal mid-portion of the cart assembly 10, in the direction of arrow labeled "B" in FIG. 1. The upwardly directed upper handle-bearing frame members 34, having that transverse, adjustable tightenable, horizontally disposed third or mid pivot axis 44 arranged about one third of the way up from the lower base member 12 may in itself be pivoted around that transverse pivot axis 44, in the direction as indicated by arrow "C" (in FIG. 1) to further compact the cart assembly 10, into its fully "tucked-in" collapsed configuration. The third or mid point pivot axis 44 is adjustably secured into and out of a fixed orientation by the adjustable knobs 51 on each end thereof, as represented best in FIGS. 2, 4 and 5. The J-shaped member 62 supporting the fifth or rearmost wheel 60 is biased downwardly, pivotable about its juncture hub 64 with the rear transverse axle 24 so as to bring the fifth wheel 60 into position between the drive wheels 26. The entire cart assembly 10 is ultimately carryable by grasping the transverse pivot axis 44 arranged between the upwardly directed frame members 34, as shown in FIG. 9, thus functioning as a carry handle. The cart assembly 10 is thus articulable about its three horizontally disposed and vertically spaced apart axes 36, 44 and 22, so as to controllably collapse the cart assembly 10 in sequential, adjustably-sized, stepped configuration.

The invention thus comprises a foldable cart assembly which is arranged to provide trackable directable transportation to enable the cart assembly to autonomously follow the safe path already taken a product or a person, or be directed along ahead or behind, as instructed by the transponder "T" (represented in FIG. 1) carried and controlled by that product or person. The cart contains sensors and computer-controlled drive wheels to enable that cart assembly, when fully opened, to follow a safe path as directed by received ultrasound and RF signals. That cart assembly is also collapsible, so as to be contained in a minimal volume and even carried by an individual.

We claim:

1. An articulably collapsible cart assembly having a lower frame, the cart assembly enabled to carry a load in an open orientation, and to be collapsed into a minimal tri-folded configuration without a load, the cart assembly comprising:
   a lower frame first end having a pair of free-wheeling support wheels in a spaced apart manner on an axle;
   a lower frame second end connected to the first end by an elongated connecting frame, the second end having a pair of wheels thereon, and wherein the elongated connecting frame has a mid-frame lower collapse axis thereon which permits the first end of the elongated frame to be folded very compactly under the lower frame second end;
   an upper frame arrangement connected to the lower frame, the upper frame arrangement having an uppermost collapse axis thereacross and an intermediate, transversely disposed, cart-assembly-carry, collapse axis thereacross, wherein the intermediate axis comprises a carry handle, the uppermost collapse axis and the intermediate collapse axis enabling the uppermost frame arrangement to be pivoted counter to one another towards the lower frame, to collapse the cart assembly into a hand-carryable configuration by the intermediate, cart-assembly-carry collapse axis handle.

2. The collapsible cart assembly as recited in claim 1, wherein the intermediate axis permits the cart assembly to be carried in its collapsed hand-carryable configuration.

3. The collapsible cart assembly as recited in claim 1, wherein the second end of the frame has a pair of drive wheels thereon.

4. The collapsible cart assembly as recited in claim 3, wherein each of the pair of drive wheels are empowered by an independent drive motor.

5. The collapsible cart assembly as recited in claim 3, wherein a fifth wheel is supported between the pair of drive wheels.

6. The collapsible cart assembly as recited in claim 5, wherein the fifth wheel is adjustably supported about a swivel axis.

7. The collapsible cart assembly as recited in claim 1, wherein a pair of horizontally spaced apart sensor support arms extend from the upper frame arrangement.

8. The collapsible cart assembly as recited in claim 1 wherein the lower frame and the upper frame arrangement each have a load supporting securement arrangement thereon.

9. The collapsible cart assembly as recited in claim 1, wherein an enclosure housing is supportively arranged between the drive wheels, so as to enclose control means and empowerment means therein.

10. The collapsible cart assembly as recited in claim 1, wherein the uppermost collapse axis adjustably supports a "U" shaped handle.

11. The collapsible cart assembly as recited in claim 1, wherein the cart assembly is autonomous so as to provide self-directed, self-propelled motion for a user thereof.

12. A method of collapsing a cart assembly from an open, load carrying configuration to a collapsed minimally sized, hand carryable configuration, comprising:
   connecting a wheeled first frame end to a wheeled second frame end by a lower pivot axis articulably disposed midway therebetween, thereby constructing an elongated lower frame arrangement;
   connecting an upper frame arrangement to the wheeled second end of the lower frame arrangement;
   dividing the upper frame arrangement into an intermediate, pivotable frame portion and a pivotably attached uppermost frame portion connected to one another by an upper pivot axis;
   swinging the wheeled first end of the elongated lower frame arrangement about its lower, midway-disposed, pivot axis, and into a disposition under the wheeled second frame end of the elongated lower frame;
   swinging the uppermost frame portion about the upper pivot axis into a nesting disposition between side portions of the intermediate pivotable frame portion;
   swinging the combined uppermost frame portion nested between the side portions of the intermediate pivotable frame portion and the intermediate pivotable frame portion about an intermediate cart-assembly-carry pivot axis comprising a carry handle so as to lie on top of and into close nesting orientation with the second wheeled end of the elongated lower frame portion, wherein the intermediate pivot axis thus becomes a carry handle for the cart assembly.

13. The method as recited in claim 12, wherein the wheeled second frame end has a pair of motorized wheels thereon.

14. The method as recited in claim 13, wherein the motorized wheels are individually empowered as to direction and speed by a control computer.

15. The method as recited in claim 13, wherein the cart assembly is a golf club carrying cart.

16. The method as recited in claim 14, including;
arranging a sensor array on the cart so as to permit control and direction to the motorized wheels to function with autonomous cart motion for a user thereof.

17. An articulably collapsible autonomously mobile cart assembly enabled to carry a load in an open orientation, collapsable into a minimal tri-folded configuration without a load, the cart assembly comprising:
- an elongated lower frame having a pair of free-wheeling support wheels on an axle at one first end, and a pair of individually driven, individually instructed, multi-direction-of-rotation and individual speed controlled drive wheels at a second end of the elongated frame, the elongated frame having a transversely disposed pivot axis at a mid-point thereof to enable the elongated frame to nestably fold the first end thereof under the second end thereof;
- an upper frame arrangement connected to a lower connector frame, the upper frame arrangement having an uppermost collapse axis thereacross and a combination intermediate collapse axis and cart-assembly-carry-handle thereacross, the uppermost collapse axis and the intermediate collapse axis enabling the uppermost frame arrangement and the lower connector frame to be pivoted counter to one another towards the lower elongated frame, to thus enable the collapse of the cart assembly into a hand-carryable configuration.

18. The cart assembly as recited in claim 17, wherein the drive wheels have a multisensor arrangement communicating through a control unit to control the speed and direction of rotation of the drive wheels so as to control the direction of motion of the cart assembly.

19. The cart assembly as recited in claim 18, wherein the multisensory arrangement comprises a pair of spaced apart ultrasound transceivers and an RF transceiver connected to the control unit for enabling the autonomous mobility of the cart assembly.

* * * * *